United States Patent
DeVito et al.

(10) Patent No.: US 10,767,533 B1
(45) Date of Patent: Sep. 8, 2020

(54) REAGENT INJECTOR

(71) Applicant: Tenneco Automotive Operating Company Inc., Lake Forest, IL (US)

(72) Inventors: Mark DeVito, Jackson, MI (US); Abhijit Upadhye, Ann Arbor, MI (US); Jeffrey Tong, Shanghai (CN); Alex Kong, Wuxi (CN); Alan Brockman, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/288,186

(22) Filed: Feb. 28, 2019

(51) Int. Cl.
*F01N 3/20* (2006.01)

(52) U.S. Cl.
CPC .......... *F01N 3/208* (2013.01); *F01N 2260/02* (2013.01); *F01N 2610/11* (2013.01); *F01N 2610/14* (2013.01)

(58) Field of Classification Search
CPC .. F01N 3/208; F01N 2260/02; F01N 2610/14; F01N 2610/11
See application file for complete search history.

(56) References Cited

U.S. PATENT DOCUMENTS

| | | | |
|---|---|---|---|
| 9,194,270 B2 | 11/2015 | Winkler et al. | |
| 9,435,243 B2 | 9/2016 | Knittel et al. | |
| 9,598,994 B2 | 3/2017 | Winkler et al. | |
| 2009/0107126 A1 * | 4/2009 | Bugos ................. | F01N 3/2066 60/301 |
| 2013/0228231 A1 | 9/2013 | Nagel et al. | |
| 2014/0054394 A1 | 2/2014 | Bugos et al. | |
| 2016/0305298 A1 | 10/2016 | Murst et al. | |
| 2018/0328250 A1 | 11/2018 | Upadhye et al. | |

FOREIGN PATENT DOCUMENTS

| | | |
|---|---|---|
| CN | 105257378 B | 9/2017 |
| CN | 108757251 A | 11/2018 |
| EP | 2724000 B1 | 9/2017 |
| JP | 2003083055 A | 3/2003 |
| KR | 101795943 B1 | 11/2017 |
| WO | 2014048611 A1 | 4/2014 |

OTHER PUBLICATIONS

PCT International Search Report and Written Opinion of the International Searching Authority for Counterpart PCT/US2020/016004, Dated Jul. 3, 2020.

* cited by examiner

*Primary Examiner* — Brandon D Lee
(74) *Attorney, Agent, or Firm* — McGarry Bair PC

(57) ABSTRACT

An injector includes an injector body having an upper portion defining a top surface. An injector core is received through the upper portion. The injector core has an interfacing surface that is disposed adjacent and raised with respect to the top surface. A cover member is disposed on the upper portion of the injector body. The cover member has a top wall disposed proximal to the top surface of the injector body and defining an aperture for receiving the injector core therethrough, a side wall extending from the top wall, and a lip that is disposed at an end of the side wall. The lip is adapted to be attached to a circumferential wall of the injector body through a snap-fit connection. Upon attachment, the top wall presses on the interfacing surface of the injector core to restrict an axial movement of the injector core relative to the injector body.

20 Claims, 10 Drawing Sheets

REAGENT INJECTOR

TECHNICAL FIELD

The present disclosure relates to injectors and, more particularly, relates to an injector for injecting a reagent into an exhaust stream of an engine.

BACKGROUND

Injectors for injecting a reagent into an exhaust stream of an engine typically include an injector core having several components that are at least partially received within an injector body. Therefore, the injector core may need to be secured with the injector body. In many cases, the injector core is welded to the injector body. However, the process for welding the injector core to the injector body may be challenging and time consuming, at least in part, due to a complexity of the geometry of the injector body and the injector body. Further, the welds may be located such that a load transfer path on the injector core for securing the injector core to the injector body is less than optimal. Consequently, this may pose various challenges in the assembly, manufacture, and operation of the injector as a whole.

In other cases of assembling and manufacturing injectors, a cover member may be provided for securing the injector core with the injector body. However, conventional designs of injector bodies, injector cores and/or the cover members are configured such that the injector core may be rendered unconstrained in its movement relative to the injector body and/or the cover member. The unconstrained injector core may interfere with a normal operation of the injector.

Therefore, it may be desirable to provide an improved injector addressing some or all of these concerns.

SUMMARY

In an aspect of the present disclosure, an injector for injecting a reagent includes an injector body, an injector core, and a cover member. The injector body has an upper portion and a lower portion disposed along a longitudinal axis of the injector body. The upper portion defines a top surface of the injector body. The injector core is received at least partially within the injector body through the upper portion. The injector core has an interfacing surface that is disposed adjacent to the top surface of the injector body and raised with respect to the top surface of the injector body. The cover member is disposed on the upper portion of the injector body. The cover member has a top wall defining an aperture for receiving the injector core therethrough. The top wall is disposed proximal to the top surface of the injector body. The cover member also has a side wall extending from the top wall, and a lip that is disposed at an end of the side wall. The lip is adapted to be attached to a circumferential wall of the injector body through a snap-fit connection such that upon attachment of the lip to the circumferential wall of the injector body, the top wall of the cover member presses on the interfacing surface of the injector core to restrict an axial movement of the injector core relative to the injector body along the longitudinal axis.

In an embodiment, upon attachment of the lip to the circumferential wall of the injector body, the top wall of the cover member applies a force on the interfacing surface of the injector core. The force applied by the top wall of the cover member on the interfacing surface is transmitted along a load path that extends from an upper part of the injector core to a lower part of the injector core.

In an embodiment, the injector core further comprises an electrical connector housing received at least partially within the upper portion of the injector body. The electrical connector housing defines the interfacing surface. In an embodiment, the side wall of the cover member defines a cut-out that is configured to receive the electrical connector housing therethrough. In a further embodiment, the upper portion of the injector body defines a connector opening aligned with the cut-out of the cover member. The connector opening is configured to receive the electrical connector housing therethrough.

In an embodiment, the upper portion of the injector body further defines a lock opening and the electrical connector housing includes a tab that is received in the lock opening to restrict a rotational movement of the injector core relative to the injector body.

In an embodiment, the lip of the cover member has a diameter less than a diameter of the side wall of the cover member. Further, in this embodiment, the lip is attached to a groove defined on the circumferential wall of the injector body. Additionally, in an embodiment, the circumferential wall of the injector body may further include an inclined portion extending from the top surface. The inclined portion is inclined relative to the longitudinal axis of the injector body. In an additional embodiment, the circumferential wall of the injector body further includes a wide portion that is disposed between the inclined portion and the groove. A diameter of the wide portion is greater than a diameter of the lip. The inclined portion and the wide portion are configured to bias the lip into the snap-fit connection with the groove.

In an embodiment, the lip of the cover member is further attached to the circumferential wall of the injector body by one or more welds.

In another aspect of the present disclosure, an injector for injecting a reagent includes an injector body, an injector core, and a cover member. The injector body has an upper portion and a lower portion disposed along a longitudinal axis of the injector body. The upper portion defines a top surface of the injector body. The injector core is received at least partially within the injector body through the upper portion. The injector core has an interfacing surface that is disposed adjacent to the top surface of the injector body and raised with respect to the top surface of the injector body. The cover member is disposed on the upper portion of the injector body. The cover member has a top wall defining an aperture for receiving the injector core therethrough. The top wall is disposed proximal to the top surface of the injector body. The cover member also has a side wall extending from the top wall, and a lip that is disposed at an end of the side wall. The lip is adapted to be attached to a circumferential wall of the injector body through a snap-fit connection such that upon attachment of the lip to the circumferential wall of the injector body, the top wall of the cover member applies a force on the interfacing surface of the injector core to restrict an axial movement of the injector core relative to the injector body along the longitudinal axis. The force applied by the top wall of the cover member on the interfacing surface of the injector core is transmitted along a load path that extends from an upper part of the injector core to a lower part of the injector core.

In an aspect of the present disclosure, an injector for injecting a reagent includes an injector body, an injector core, and a cover member. The injector body has an upper portion and a lower portion disposed along a longitudinal axis of the injector body. The upper portion defines a top surface of the injector body and a lock opening. The injector core is received at least partially within the injector body through the upper portion. The injector core has an electrical connector housing received at least partially within the upper portion of the injector body. The electrical connector housing defines an interfacing surface that is disposed adjacent to the top surface of the injector body and raised with respect to the top surface of the injector body. The electrical connector housing also includes a tab that is received in the lock opening of the injector body to restrict a rotational movement of the injector core relative to the injector body. The cover member is disposed on the upper portion of the injector body. The cover member has a top wall defining an aperture for receiving the injector core therethrough. The top wall is disposed proximal to the top surface of the injector body. The cover member also has a side wall extending from the top wall, and a lip that is disposed at an end of the side wall. The lip is adapted to be attached to a circumferential wall of the injector body through a snap-fit connection such that upon attachment of the lip to the circumferential wall of the injector body, the top wall of the cover member presses on the interfacing surface of the electrical connector housing to restrict an axial movement of the injector core relative to the injector body along the longitudinal axis.

Other features and aspects of this disclosure will be apparent from the following description and the accompanying drawings.

DETAILED DESCRIPTION

Example embodiments will now be described more fully with reference to the accompanying drawings.

It should be understood that although the present teachings may be described in connection with diesel engines and the reduction of nitrogen oxides ($NO_x$) emissions, the present teachings can be used in connection with any one of a number of exhaust streams, such as, by way of non-limiting examples, those from gasoline, turbine, fuel cell, jet or any other power source outputting a discharge stream. Moreover, the present teachings can be used in connection with the reduction of any one of a number of undesired emissions.

Figure 1:
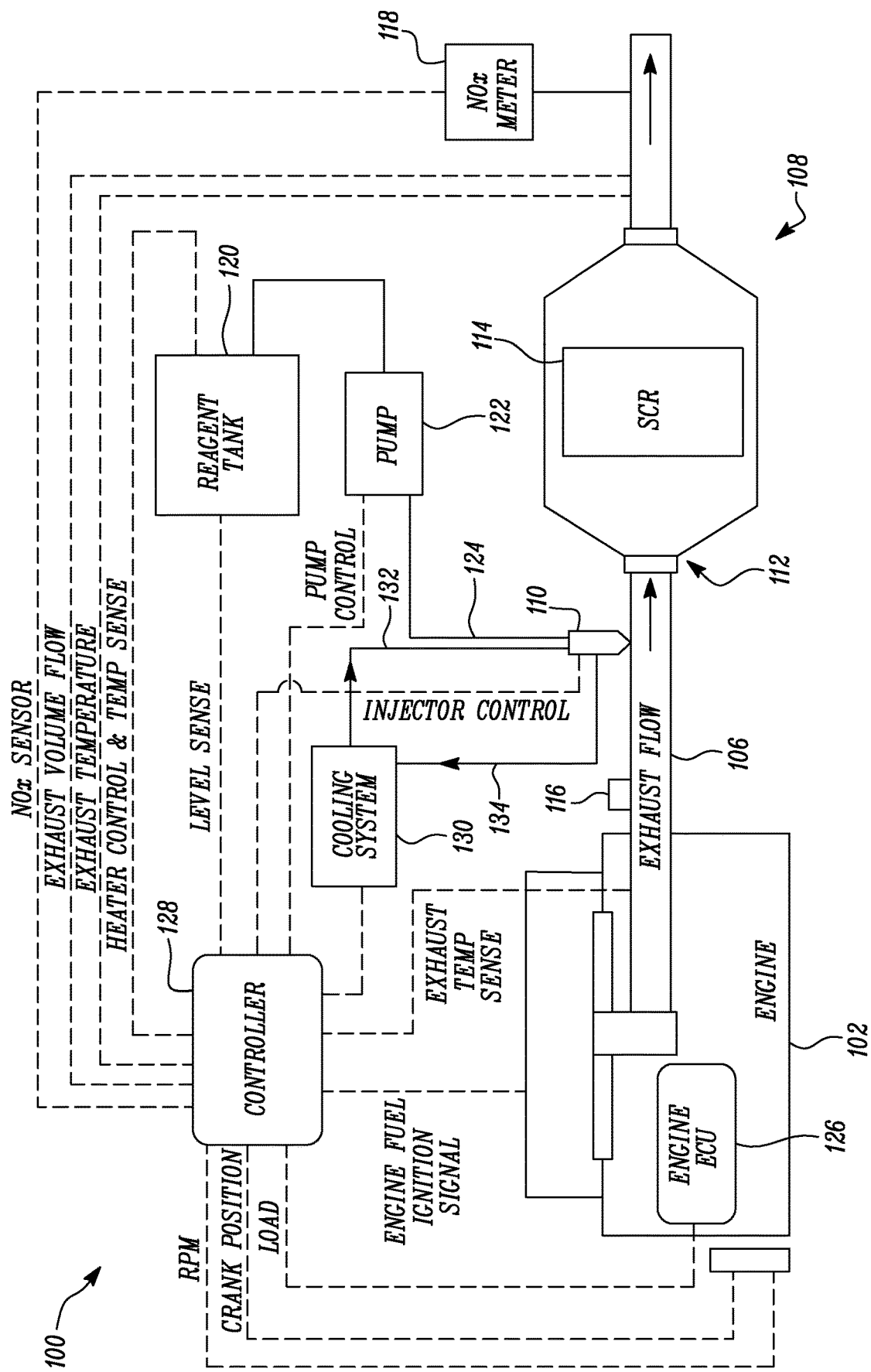
FIG. 1 is a schematic diagram depicting an exemplary exhaust aftertreatment system including a reagent injector, according to an aspect of the present disclosure.

Wherever possible, the same reference numbers will be used throughout the drawings to refer to same or like parts. FIG. 1 illustrates an exemplary exhaust system 100 for an engine 102. In FIG. 1, solid lines between elements of the exhaust system 100 denote fluid lines and dashed lines denote electrical connections. The engine 102 may be in communication with a fuel source that, once consumed, will produce exhaust gases that are discharged into an exhaust pipe or conduit 106 having an exhaust after-treatment system 108. The exhaust after-treatment system 108 may include an exhaust treatment component 112 that is disposed downstream from the engine 102. In the illustrated embodiment, the exhaust treatment component 112 includes a Selective Catalytic Reduction (SCR) component 114. The SCR component 114 may include a catalyst bed for catalytic reduction of $NO_x$ emissions in the exhaust stream. However, in other embodiments, the exhaust treatment component 112 may additionally include a Diesel Oxidation Catalyst (DOC) and a Diesel Particulate Filter (DPF). The exhaust treatment component 112 can further include components, such as a thermal enhancement device or burner 116 to increase a temperature of the exhaust gases passing through the exhaust conduit 106. Increasing the temperature of the exhaust gas is favorable to achieve light-off of the catalyst in the exhaust treatment component 112 in cold-weather conditions and upon start-up of the engine 102, as well as initiate regeneration of the exhaust treatment component 112 when the exhaust treatment component 112 includes a DPF.

To assist in reduction of emissions produced by the engine 102, the exhaust after-treatment system 108 includes an injector 110 for periodically dosing an exhaust after-treatment fluid or reagent into the exhaust stream of the engine 102. The injector 110 may be located upstream of the exhaust treatment component 112 and is operable to inject the reagent into the exhaust stream. The injector 110 is in fluid communication with a reagent tank 120 and a pump 122 via a supply line 124. A filter (not shown) may be optionally provided between the pump 122 and the reagent tank 120. The reagent may be a urea solution, a Diesel Exhaust Fluid (DEF), AdBlue®, or the like. It should also be appreciated that one or more reagents can be available in the system and can be used independently or in combination with the foregoing examples of reagents. Although a single injector 110 is illustrated in FIG. 1, multiple such injectors 110 may also be contemplated by the present disclosure. In another embodiment, the injector 110 may also be used with an air assist injector.

The amount of reagent required may vary with load, engine revolutions per minute (RPM), engine speed, exhaust gas temperature, exhaust gas flow, engine fuel injection timing, barometric pressure, relative humidity, engine coolant temperature, exhaust gas recirculation (EGR) rate and desired $NO_x$ reduction. A $NO_x$ sensor or meter 118 is positioned downstream from the SCR component 114. The $NO_x$ sensor 118 is operable to output a signal indicative of the exhaust $NO_x$ content to an Engine Control Unit (ECU) 126. All or some of the engine operating parameters may be supplied from the ECU 126 via an engine/vehicle databus to an electronic injection controller 128. The electronic injection controller 128 may also be included as part of the ECU 126. Exhaust gas temperature, exhaust gas flow, and exhaust back pressure may be measured by respective sensors (not shown). The electronic injection controller 128 may control the injector 110 to regulate injection of the reagent into the exhaust stream of the engine 102.

Temperature-sensitive reagents, such as aqueous urea, tend to solidify upon exposure to elevated temperatures of 300° C. to 650° C. that may be experienced in an engine exhaust system. It may be desirable to keep the reagent below 140° C. and preferably in a lower operating range between 5° C. and 95° C. to ensure that solidification of urea is prevented. Solidified urea, if allowed to form, may foul moving parts, openings and passageways of the injector 110. To maintain lower operating temperatures, the injector 110 may be supplied with a fluid that acts as a coolant. In the illustrated embodiment, the coolant fluid is different from the reagent and is supplied by a cooling system 130. In an embodiment, the cooling system 130 may be an engine coolant system, and may include various components, such as a radiator, a fan, a fluid tank, fluid conduits, one or more valves, and so forth. In such a case, the fluid may be water or an aqueous solution. The fluid may be supplied to the injector 110 via a fluid supply line 132. A fluid return line 134 allows the fluid to be returned to the cooling system 130 for cooling and recirculation. One or more components (e.g., valves, filters, etc.) may be provided in the fluid supply line 132 and/or the fluid return line 134. In an embodiment, the cooling system 130 may include a dedicated pump for supplying the injector 110 with the coolant fluid. The pump may be controlled based on a temperature of the reagent.

Although a separate cooling system 130 for the injector 110 is illustrated in FIG. 1, alternative cooling configurations may also be contemplated within the scope of the present disclosure. In an embodiment, the reagent may be recirculated within the injector 110 to provide cooling. Instead of the cooling system 130, a return line (not shown) may be provided between the injector 110 and the reagent tank 120 to enable recirculation of the reagent. The configuration of the injector 110 may accordingly vary.

The injector 110 will be further described with reference to FIGS. 2 to 7. The injector 110 is provided for injecting the reagent into the exhaust stream of the engine 102 (shown in FIG. 1). The injector 110 includes an injector body 202. For sake of simplicity and clarity in understanding of the present disclosure, this injector body 202 may be regarded as a first injector body and will hereinafter be referred to as "the first body" and denoted with identical numeral "202". The injector 110 also includes a second injector body 204 that, for purposes of differentiation with the first body 202, will hereinafter be simply referred to as "the second body 204".

Further, the injector 110 also includes, inter alia, a fluid inlet tube 212 a fluid outlet tube 214 that are coupled with the first body 202. Furthermore, the injector 110 also includes an injector core 208 having an electrical connector housing 210 (hereinafter referred to as "the connector housing 210") and a valve assembly 216 therein. Explanation to various components of the injector 110 will be made hereinafter.

Figure 3:
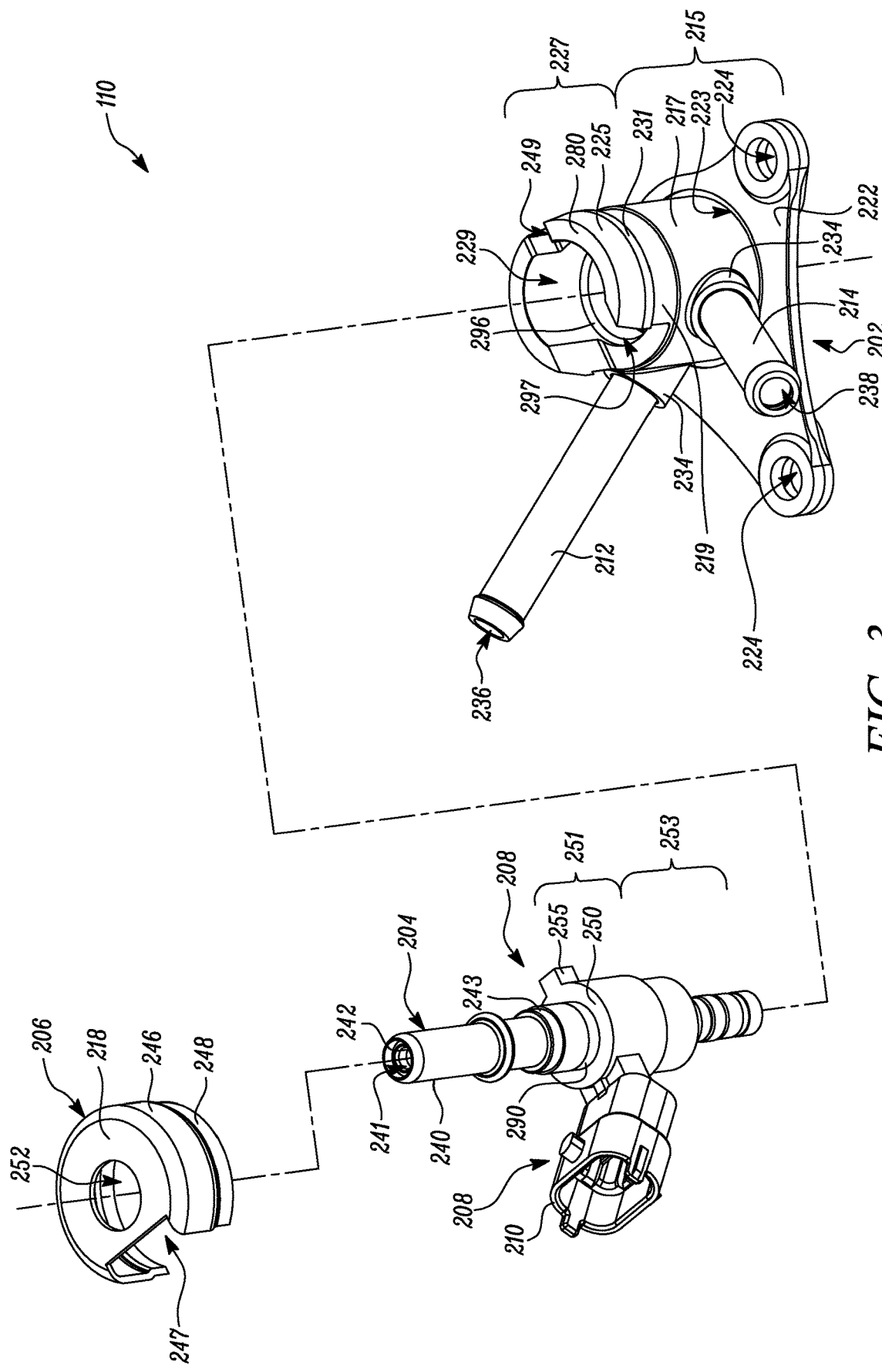
FIG. 3 is an exploded front view of the reagent injector of FIG. 2.
Figure 4:
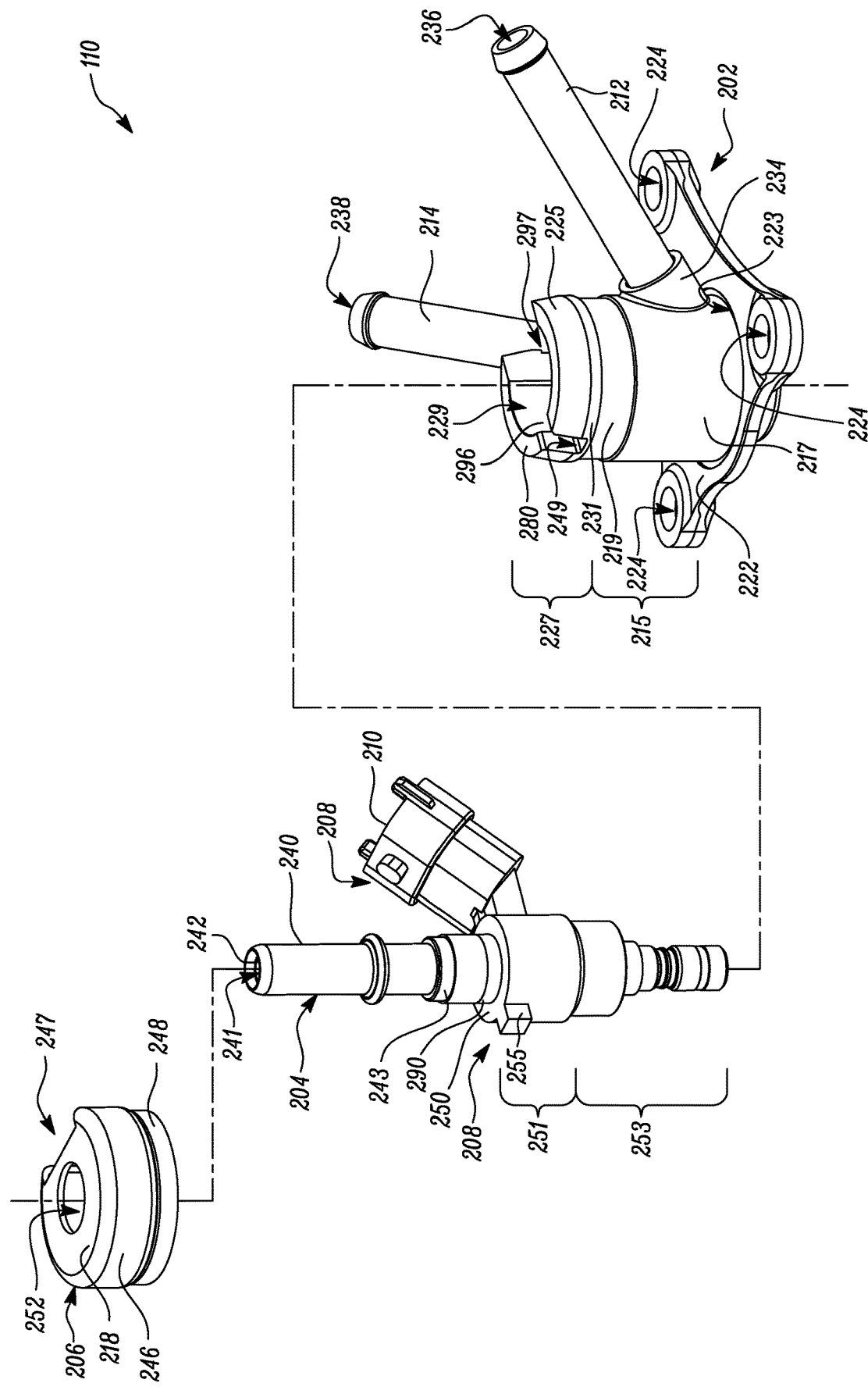
FIG. 4 is an exploded rear view of the reagent injector of FIG. 2.

As shown best in the views of FIGS. 3-4, the first body 202 may be substantially hollow. The first body 202 further includes an upper portion 227 and a lower portion 215 that are disposed along the longitudinal axis 'L' of the first body 202. As such, the first body 202 has a circumferential wall 217 that is disposed about the longitudinal axis 'L'. The upper portion 227 of the first body 202 defines a top surface 280. The upper portion 227 also defines a main opening 229 for receiving the connector housing 210 therethrough. The upper portion 227 also defines a connector opening 297 that is contiguous with the main opening 229 and is defined by the circumferential wall 217 of the first body 202.

The injector core 208 is received at least partially within the first body 202 through the upper portion 227 i.e., via the main opening 229 and the connector opening 297 defined in the upper portion of the first body 202. The injector core 208 has an interfacing surface 250 that is disposed adjacent to the top surface 280 of the first body 202 and raised with respect to the top surface 280 of the first body 202. As shown in the illustrated embodiment, the connector housing 210 of the injector core 208 defines the interfacing surface 250. The connector housing 210 is received at least partially within the upper portion 227 of the first body 202. The first body 202 may also at least partially enclose the valve assembly 216 therein while the fluid inlet tube 212 and the fluid outlet tube 214 are coupled with the lower portion 215 of the first body 202 as will be explained later herein.

The injector 110 further includes a cover member 206 that is disposed on the upper portion 227 of the first body 202. The cover member has a top wall 218. The top wall 218 is disposed proximal to the top surface 280 of the first body 202. The top wall 218 defines an aperture 252 for receiving the injector core 208 therethrough. Although in the illustrated embodiment, the aperture 252 has a substantially circular shape, other shapes of the aperture 252 may be contemplated within the scope of the present disclosure. Such shapes of the aperture 252 may include polygonal, elliptical, etc. The aperture 252 is arranged around, and preferably in a clearance fit with, a collar portion 290 that extends from the interfacing surface 250 of the connector housing 210 and is disposed about the longitudinal axis 'L'. In this manner, the aperture 252 allows the connector housing 210, and in particular, the collar portion 290 of the connector housing 210 to extend therethrough.

Figure 2:
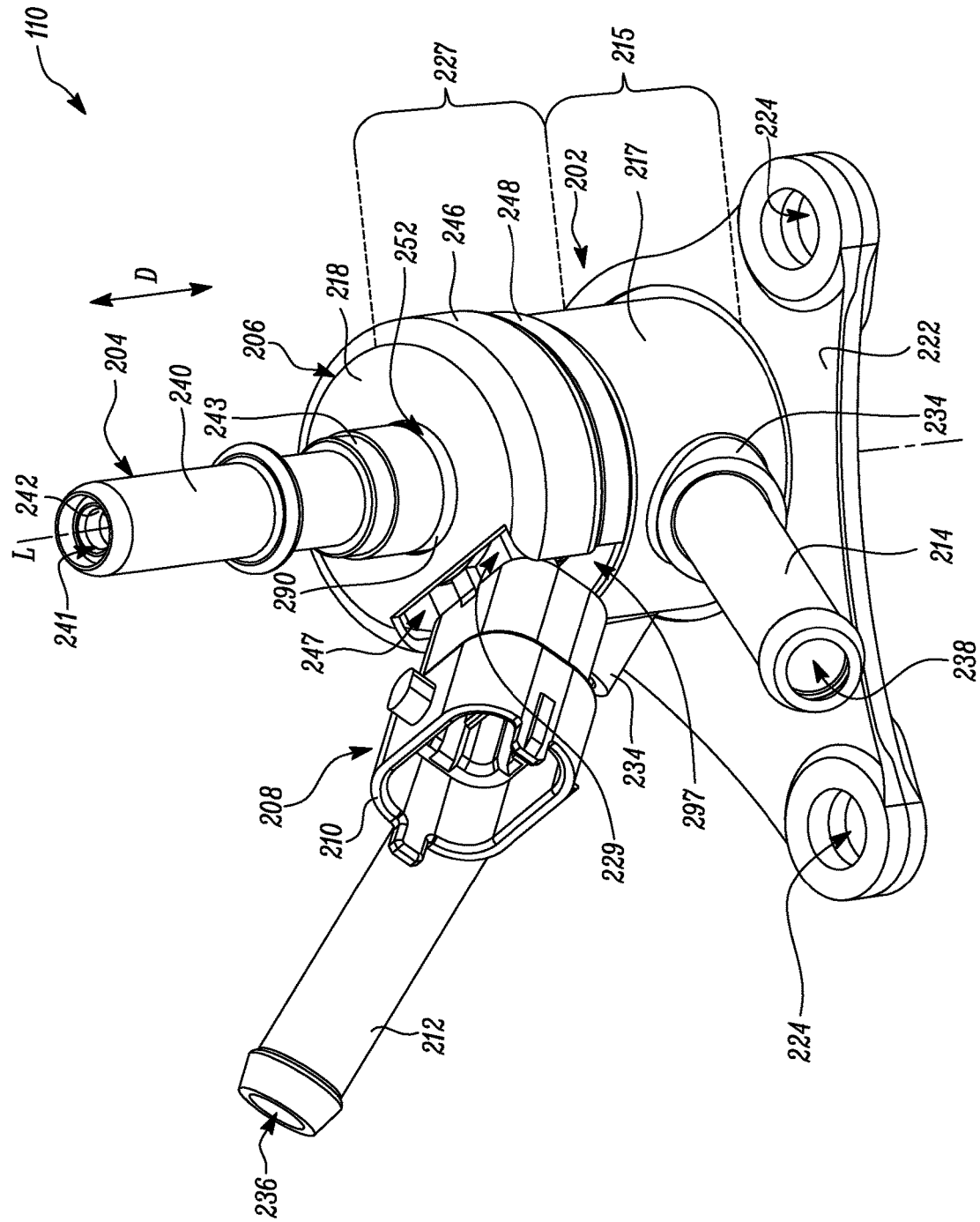
FIG. 2 is a top perspective view of the reagent injector showing a first injector body, a second injector body, an injector core, and a cover member, according to an aspect of the present disclosure.
Figure 5:
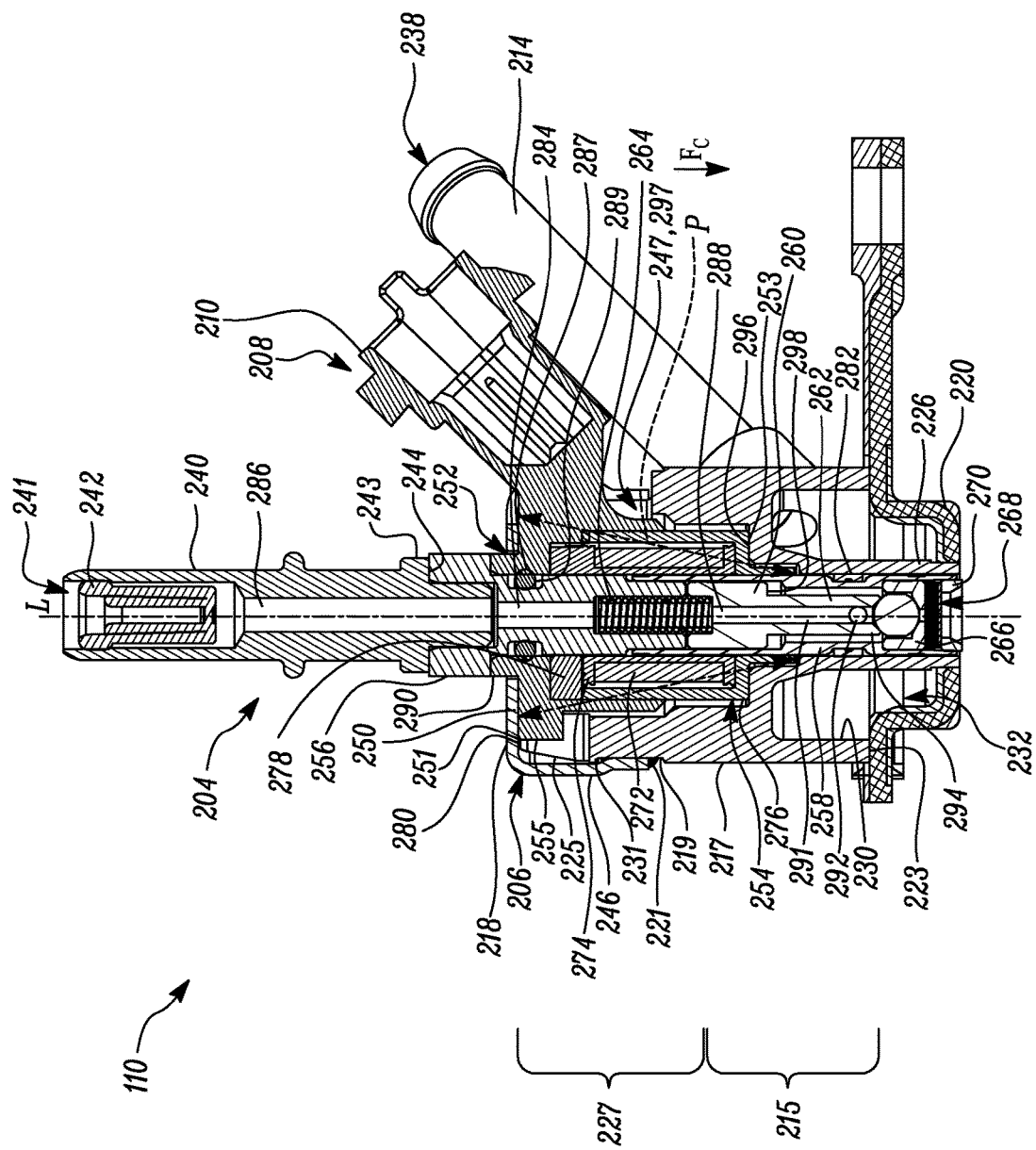
FIG. 5 is a sectional view of the reagent injector of FIG. 2.
Figure 6:
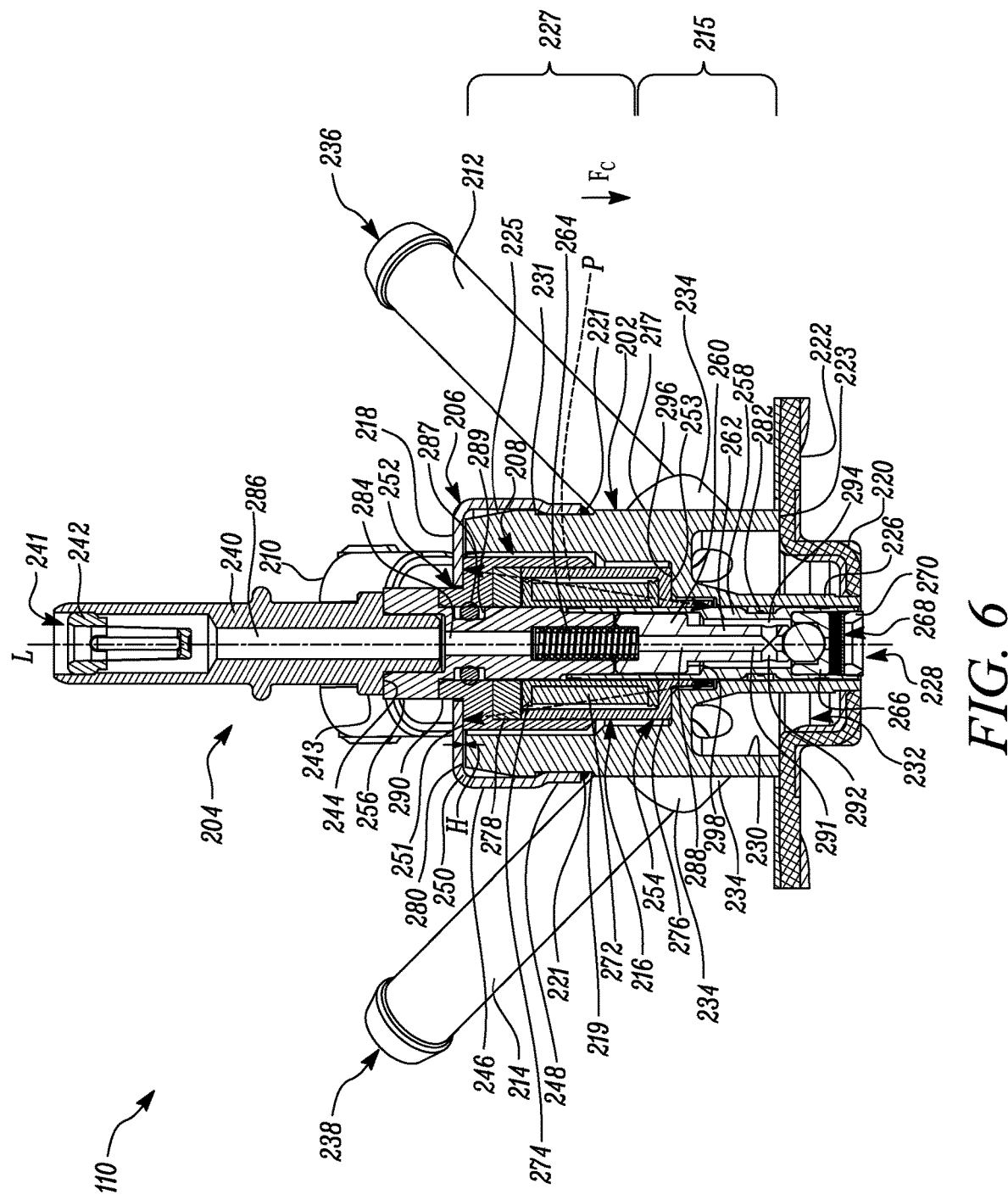
FIG. 6 is another sectional view of the reagent injector of FIG. 2.
Figure 7:
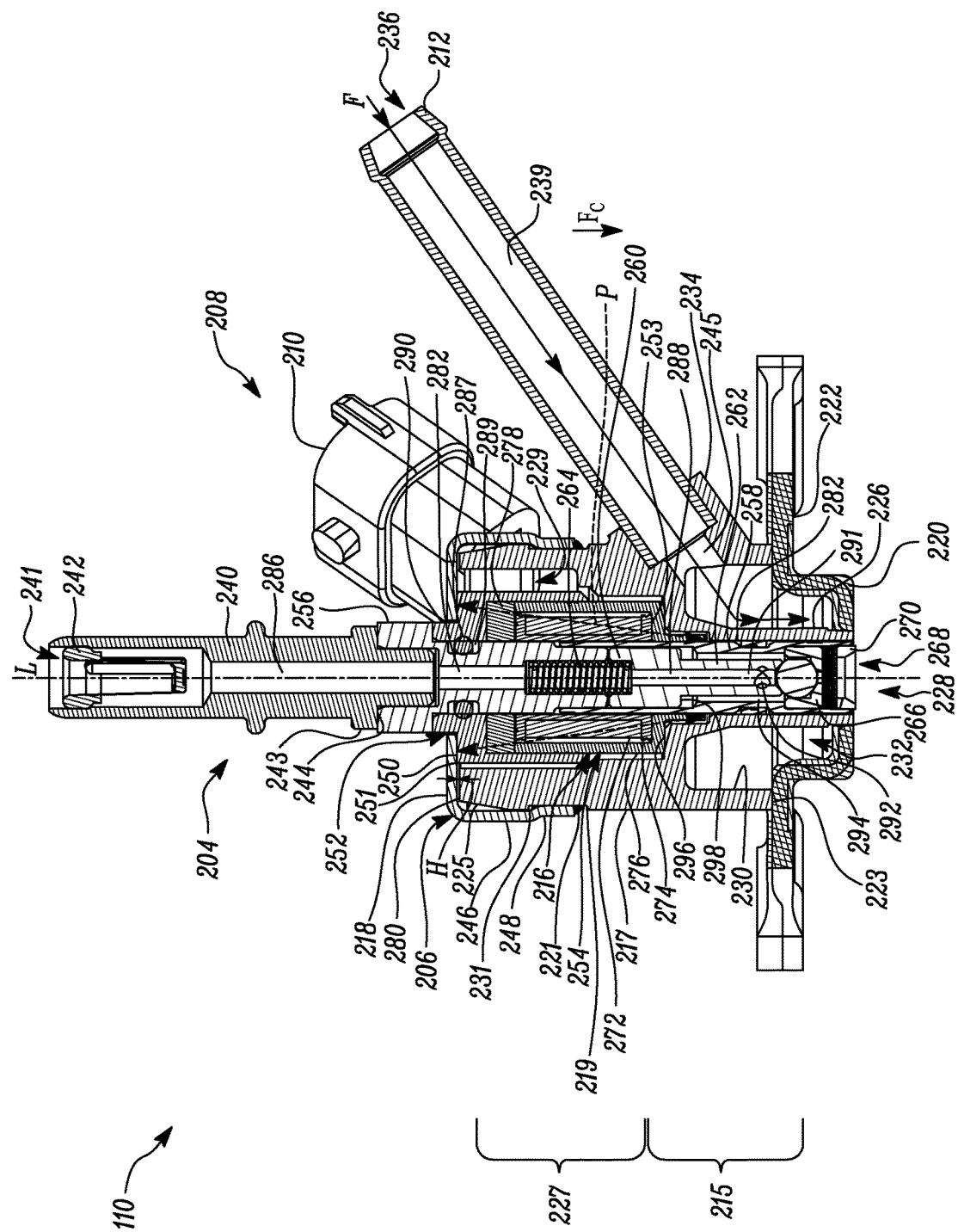
FIG. 7 is yet another sectional view of the reagent injector of FIG. 2.

As best shown in the views of FIGS. 5-7, a bottom end 223 of the first body 202 may be covered by a bottom cap 220. A mounting flange 222 is further connected to the first body 202 at the bottom end 223. As best shown in FIGS. 2-4, the mounting flange 222 defines multiple flange apertures 224. The flange apertures 224 enable the mounting flange 222 to be mounted on the exhaust conduit 106 (shown in FIG. 1) via mechanical fasteners, such as bolts. In an embodiment, the mounting flange 222 may be integral with the first body 202. The bottom cap 220 and the mounting flange 222 may be connected to the first body 202 via various methods, such as welding, brazing, adhesives, mechanical fasteners, interference fit, and so forth. In an alternative embodiment, the bottom cap 220 and/or the mounting flange 222 may be detachably connected to the first body 202. Moreover, as best shown in the views of FIGS. 5-7, the first body 202 may also include a conduit portion 226 extending from the upper portion 227 of the first body 202 and disposed in a spaced-apart manner from the bottom end 223 of the first body 202. The conduit portion 226 may have a hollow configuration. The conduit portion 226 defines an outlet opening 228 for discharge of the reagent.

Figure 8:
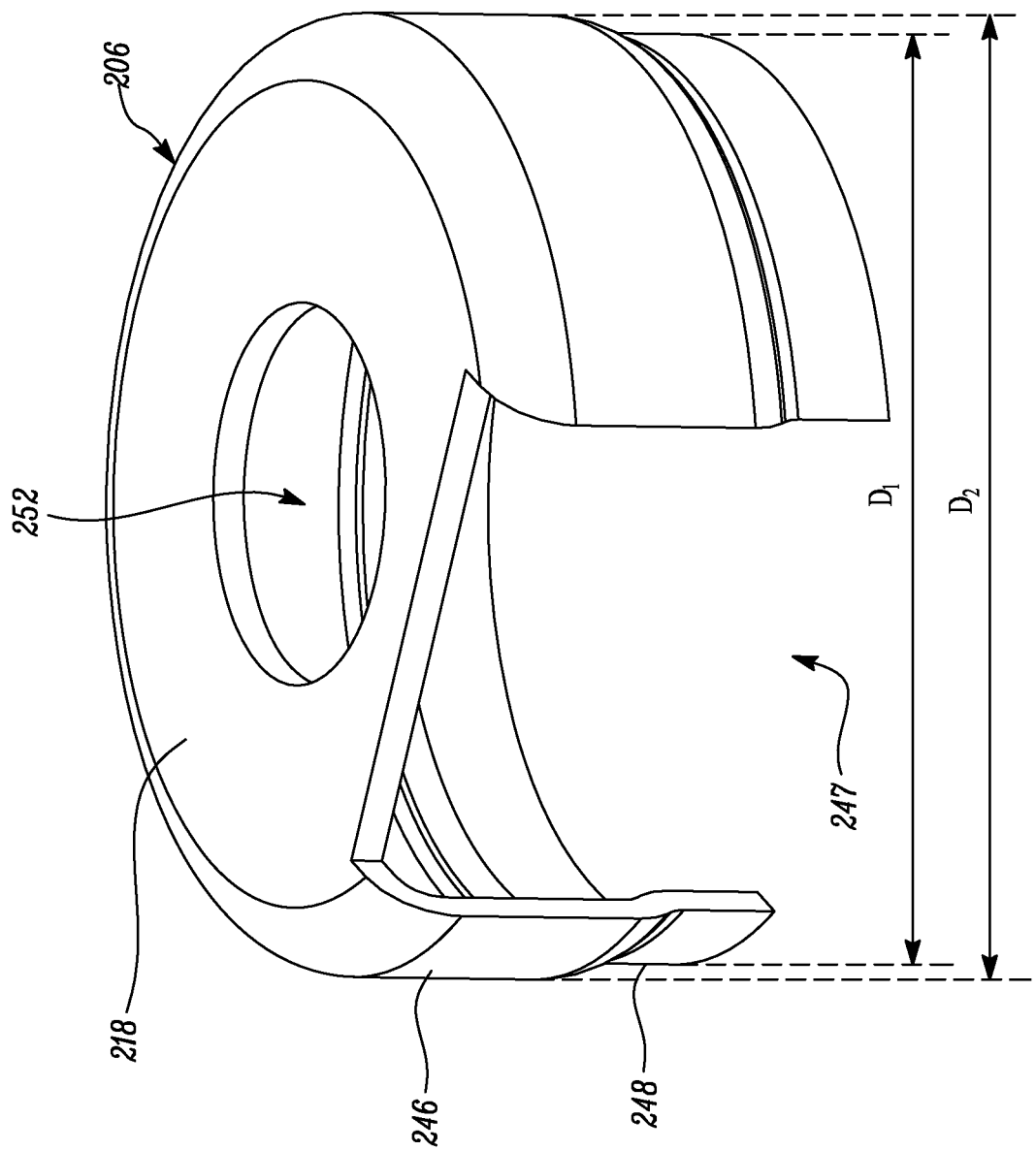
FIG. 8 is a top perspective view of the cover member of FIG. 2.

Further, referring to FIGS. 3-4 and as best shown in the view of FIG. 8, the cover member 206 has a side wall 246 that extends from the top wall 218. In an embodiment, the side wall 246 of the cover member 206 defines a cut-out 247 that is configured to receive the connector housing 210 therethrough. Additionally, the connector opening 297, defined by the upper portion 227 of the first body 202, is aligned with the cut-out 247 of the cover member 206 and configured to receive the connector housing 210 therethrough.

Figure 10:
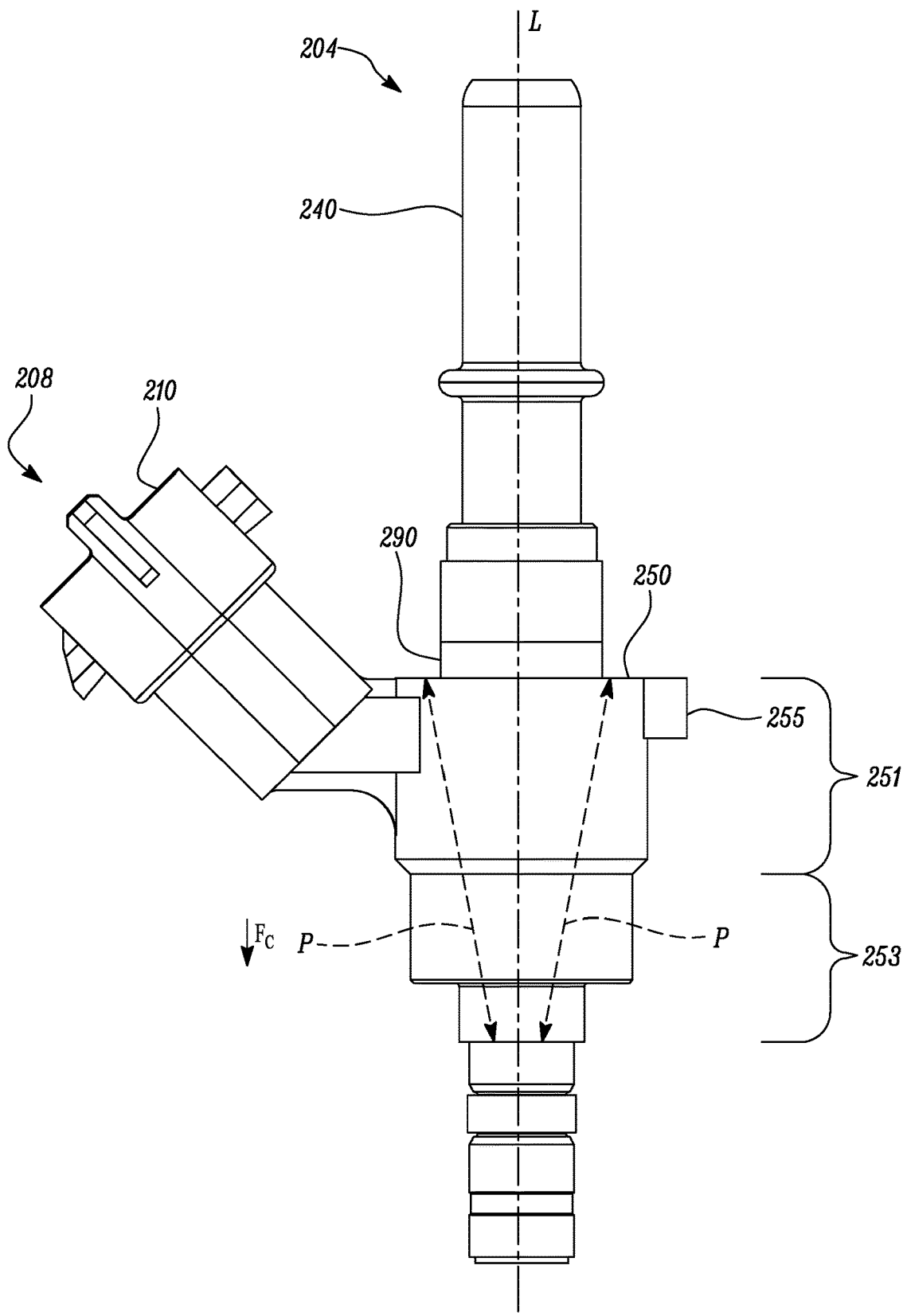
FIG. 10 is a side view of the second injector body and the injector core showing a load path along which a pressing force of the cover member of FIGS. 9 and 10 act upon assembly with the first injector body for forming the injector of FIG. 2.

Furthermore, the cover member 206 has a lip 248 that is disposed at an end of the side wall 246. The lip 248 is adapted to be attached to the circumferential wall 217 of the first body 202 through a snap-fit connection. Upon attachment of the lip 248 to the circumferential wall 217 of the first body 202, the top wall 218 of the cover member 206 presses on the interfacing surface 250 of the injector core 208 to restrict an axial movement of the injector core 208 relative to the first body 202 along the longitudinal axis 'L'. Referring to FIG. 10 and as best shown in the views of FIGS. 5-7, upon attachment of the lip 248 to the circumferential wall 217 of the first body 202, the top wall 218 of the cover member 206 applies a force '$F_c$' on the interfacing surface 250 of the injector core 208. The force '$F_c$' applied by the top wall 218 of the cover member 206 on the interfacing surface 250 is transmitted along a load path 'P' that extends from an upper part 251 of the injector core 208 to a lower part 253 of the injector core 208.

Figure 9:
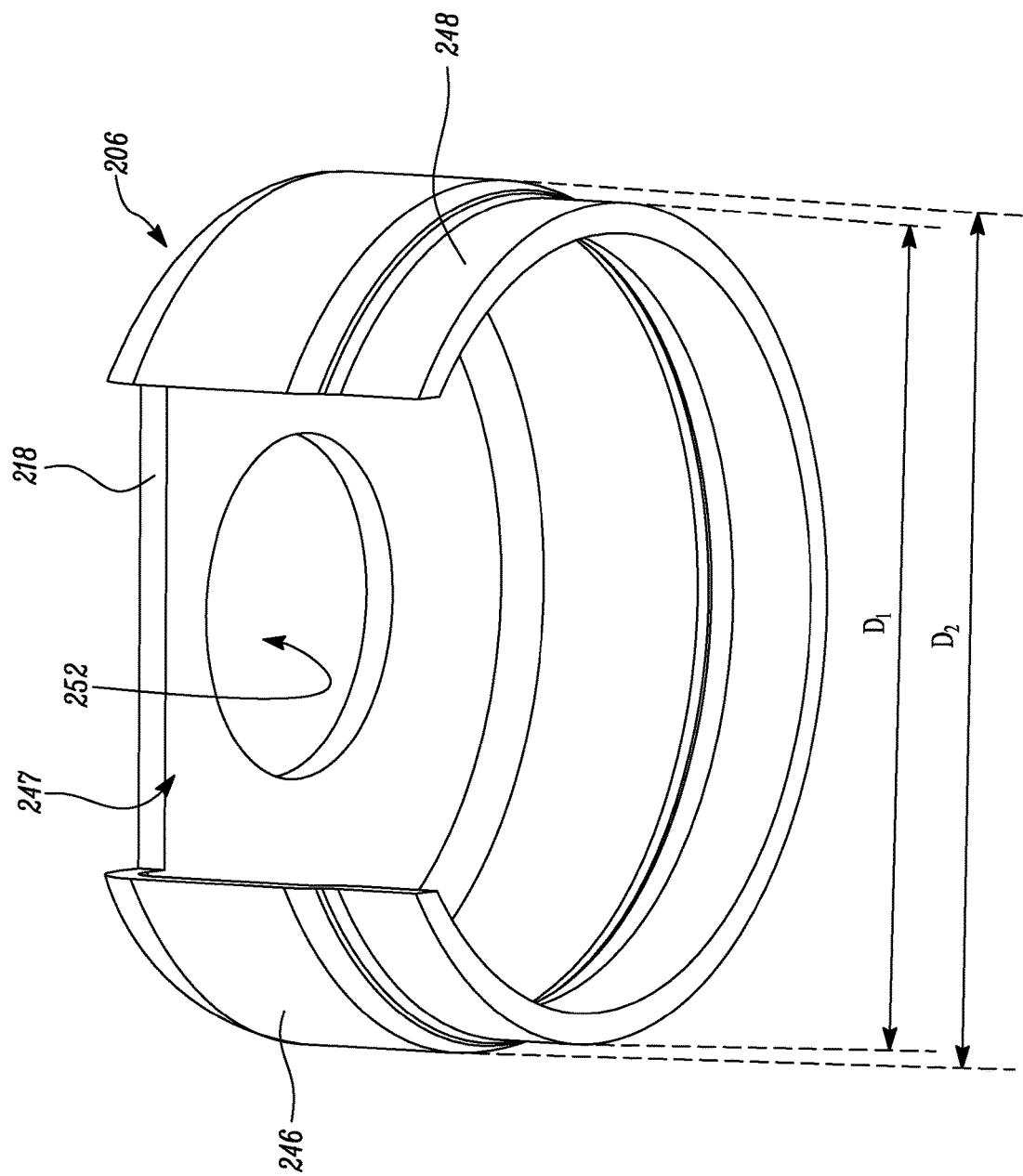
FIG. 9 is a bottom perspective view of the cover member of FIG. 2.

In an embodiment as shown best in the views of FIGS. 8 and 9, the lip 218 of the cover member 206 has a diameter $D_1$ less than a diameter $D_2$ of the side wall 246 of the cover member 206. In this embodiment, as shown best in the views of FIGS. 3-7, the lip 218 may be attached to a groove 219 defined on the circumferential wall 217 of the first body 202. As such, the lip 218 of the cover member 206 may be attached to the circumferential wall 217 of the first body 202, and in particular, to the circumferential wall 217 adjoining the groove 219 by one or more welds 221.

Additionally, in an embodiment, the circumferential wall 217 of the first body 202 may further include an inclined portion 225 extending from the top surface 280. The inclined portion 225 is inclined relative to the longitudinal axis 'L' of the first body 202. In an additional embodiment, the circumferential wall 217 of the first body 202 further includes a wide portion 231 that is disposed between the inclined portion 225 and the groove 219. Referring to FIGS. 8 and 9, a diameter '$D^3$' of the wide portion 231 is greater than a diameter '$D_1$' of the lip 248 shown in FIGS. 3 and 4 respectively. The inclined portion 225 and the wide portion 231 are configured to bias the lip 248 into the snap-fit connection with the groove 219. Stated differently, the wide portion 231 disclosed herein may be regarded as a detent and upon moving the lip 248 of the cover member 206 past the wide portion 231 i.e., the detent, the wide portion 231 prevents any inadvertent axial movement of the cover member 206 relative to the first body 202.

In an embodiment as shown best in the views of FIGS. 3 and 4 respectively, the upper portion 227 of the first body 202 further defines a lock opening 249, and the connector housing 210 includes a tab 255. The tab 255 of the housing connector 210 is received in the lock opening 249 to restrict a rotational movement of the injector core 208 relative to the first body 202. In this manner, the lock opening 249 and the tab 255 together prevent rotational movement of the injector core 208 about the longitudinal axis 'L' upon assembly.

In the illustrated embodiment as shown best in the views of FIGS. 5-7, the first body 202 further includes a recessed portion 230 proximate to the bottom end 223. The recessed portion 230 and the bottom cap 220 may together define a fluid chamber 232. The fluid chamber 232 may at least partly surround the conduit portion 226. The first body 202 further includes a pair of receiving portions 234 for at least partly receiving the fluid inlet and outlet tubes 212, 214. The receiving portions 234 may be embodied as bosses extending from the first body 202. The receiving portions 234 may be angularly spaced part from each other on the circumferential wall 217 of the first body 202. The fluid inlet and outlet tubes 212, 214 may be connected to the respective receiving portions 234 of the first body 202 via various methods, such as welding, brazing, adhesives, mechanical fasteners, interference fit, and so forth. In an embodiment, the fluid inlet and outlet tubes 212, 214 may be detachably connected to the first body 202. The receiving portions 234 may also be inclined with respect to the longitudinal axis 'L' of the injector 110. Therefore, the fluid inlet and outlet tubes 212, 214 may also be inclined with respect to the longitudinal axis 'L'.

The fluid inlet and outlet tubes 212, 214 may be hollow tubes that allow a flow of a fluid therethrough. The fluid inlet and outlet tubes 212, 214 may be in fluid communication with the fluid chamber 232. Further, the fluid inlet tube 212 defines a fluid inlet 236 disposed in fluid communication with the fluid chamber 232. Similarly, the fluid outlet tube 214 defines a fluid outlet 238 disposed in fluid communication with the fluid chamber 232. The fluid inlet 236 may be arranged to receive a fluid that is different from the reagent. In an embodiment, the fluid may be a coolant (e.g., water). The fluid inlet 236 may receive the fluid from the cooling system 130 (shown in FIG. 1) via the fluid supply line 132. Further, the fluid outlet 238 may discharge the fluid to the fluid return line 134. The fluid may flow into the fluid chamber 232 through the fluid inlet tube 212, as indicated by an exemplary fluid flow path 'F' in FIG. 7. A fluid passage 239 of the fluid inlet tube 212 may be in fluid communication with an inclined bore 245 of the first body 202. The inclined bore 245 is in fluid communication with the fluid chamber 232. Further, the fluid in the fluid chamber 232 may exit the injector 110 through the fluid outlet tube 214. A flow passage (not shown) of the fluid outlet tube 214 may be in fluid communication with another inclined bore (not shown) of the first body 202. This inclined bore may be in fluid communication with the fluid chamber 232. The fluid in the fluid chamber 232 may cool the conduit portion 226 of the first body 202. Therefore, one or more components of the valve assembly 216 that are at least partly received within the conduit portion 226 of the first body 202 may be cooled. The reagent flowing through the conduit portion 226 may also be cooled. This may substantially prevent solidification of the reagent due to high temperatures of the exhaust system 100 and improve operability of the injector 110.

As shown in FIGS. 2-7, the second body 204 includes a reagent tube 240. The reagent tube 240 may be oriented along the longitudinal axis 'L'. Further, the reagent tube 240 may be substantially hollow with open ends. The reagent tube 240 may receive the reagent from the pump 122 (shown in FIG. 1) via the supply line 124. The reagent tube 240 further receives the reagent at a reagent inlet 241. The reagent tube 240 includes an inlet filter 242 through which the reagent passes. The second body 204 further includes a flange section 243 extending from the reagent tube 240. The flange section 243 may have a stepped configuration and includes a lower surface 244.

The valve assembly 216 is configured to selectively dispense the reagent through the outlet opening 228 of the first body 202. In embodiments herein, upon welding the lip 248 to the groove 219 on the circumferential wall 217 of the first body 202, the valve assembly 216 may not be removable from the injector 110. The valve assembly 216 (shown in FIGS. 5 to 7) includes an electromagnet 254, a pole piece 256, an outer tube 258, an inner tube 260, a valve member 262, a return spring 264, a seat member 266, a nozzle portion 268, and an end member 270.

The electromagnet 254 includes a coil 272, a bobbin 274, a tube 276, and an end cap 278. The electromagnet 254 may be disposed within the first body 202. The coil 272 includes a coil of wire wrapped around the bobbin 274. The tube 276 at least partly surrounds the bobbin 274. The tube 276 may be supported on a shoulder 296 of the first body 202. The end cap 278 at least partly covers the bobbin 274 and the tube 276 from the top. The end cap 278 and the tube 276 may constitute a flux frame of the electromagnet 254. The connector housing 210 is connected to the electromagnet 254. Specifically, the connector housing 210 may be connected to the flux frame of the electromagnet 254. In an embodiments, the connector housing 210 may be connected to the electromagnet 254 by various methods, such as welding, brazing, mechanical fasteners, adhesives, interference fit, and so forth. In an embodiment, the connector housing 210 may be detachably connected to the electromagnet 254. Power may be provided to the coil 272 via one or more wires (not shown) passing through the connector housing 210. The coil 272 may be energized in response to a signal from the electronic injection controller 128. A sealing element 282 is also installed between the outer tube 258 and the conduit portion 226 of the first body 202. The sealing element 282 may prevent any leakage of the reagent and/or exhaust gases.

The pole piece 256 may be at least partly received within the connector housing 210 and the electromagnet 254. The pole piece 256 defines a bore 284 extending therethrough. In the illustrated embodiment, the bore 284 is a counterbore. The bore 284 is in fluid communication with a passage 286 of the reagent tube 240. Further, the reagent tube 240 is at least partly received within a wider portion of the bore 284 of the pole piece 256. A sealing member 287 is disposed between the reagent tube 240 and the connector housing 210. The sealing member 287 may be an O-ring. Further, the sealing member 287 is received in a groove 289 of the pole piece 256. In an alternative embodiment, the sealing member 287 may be received in a groove (not shown) of the connector housing 210. The sealing member 287 may prevent leakage of the reagent from the injector 110. Moreover, in embodiments herein, the sealing member 287 is configured to support the pole piece 256 within the connector housing 210.

The inner tube 260 defines a tube bore 288 in fluid communication with the bore 284 of the pole piece 256. In an embodiment, the inner tube 260, the pole piece 256, and the reagent tube 240 may be coaxially aligned with each other. In an embodiment, the inner tube 260 may be made of a magnetic material (for example, 430 stainless steel) such that electrical energization of the coil 272 produces a magnetic field urging the inner tube 260 towards the pole piece 256.

The return spring 264 is received between respective shoulders of the pole piece 256 and the inner tube 260. Further, the inner tube 260 is enclosed within the outer tube 258. The outer tube 258 is at least partly received within the electromagnet 254 and the conduit portion 226 of the first body 202. The inner tube 260 is placed co-axially with the pole piece 256 and disposed in sliding engagement with the pole piece 256 against a biasing force of the return spring 264. The valve member 262 extends from an end 298 of the inner tube 260. In alternative embodiments, the valve member 262 may be connected to the inner tube 260 via various methods, such as welding, adhesives, interference fit, brazing, mechanical fasteners, and so forth. In such alternative embodiments, the valve member 262 may further include a flange that supports the end 298 of the inner tube 260.

The valve member 262 further defines multiple tube holes 292. The tube holes 292 may be through holes defined on a wall of the inner tube 260. In an embodiment, the inner tube 260 may include two such tubes holes 292 that are located diametrically opposite to each other. The tube holes 292 may allow fluid communication between the tube bore 288 and a tube chamber 294. The tube chamber 294 may be at least partly defined by a bore of the outer tube 258. The return spring 264 normally urges the inner tube 260 and the valve member 262 against a valve seat of the seat member 266. In a closed position, a plug portion of the valve member 262 rests on the valve seat and closes a seat aperture of the seat member 266. The plug portion may be disposed at an end of the valve member 262. Upon energization of the coil 272, the inner tube 260 may move towards the pole piece 256, thereby moving the valve member 262 away from the seat member 266. The plug portion of the valve member 262 is therefore displaced from the valve seat of the seat member 266 in an open position. In the open position, the reagent is allowed to flow through a seat aperture of the seat member 266.

The nozzle portion 268 may be located adjacent to the seat member 266. The nozzle portion 268 may atomize the reagent flowing therethrough. Therefore, the nozzle portion 268 may generate a spray of the reagent. The end member 270 may support the nozzle portion 268 within the outer tube 258. The end member 270 further defines a bore to allow the atomized reagent to flow therethrough. The reagent spray may exit through the outlet opening 228 of the first body 202 when the injector 110 is dispensing the reagent into the exhaust stream or flow of the engine 102 (shown in FIG. 1).

During an operation of the injector 110, the reagent is received at the reagent inlet 241. An exemplary reagent flow path 'R' is shown in FIG. 6. The reagent flows through the inlet filter 242 and the passage 286 of the reagent tube 240. The reagent further flows into the bore 284 of the pole piece 256 and the tube bore 288 of the inner tube 260. The reagent further flows into a passageway 291 of the valve member 262 and may exit the valve member 262 through the holes 292 and enters the tube chamber 294. In the closed position of the valve member 262, the plug portion of the valve member 262 may prevent the reagent from exiting the tube chamber 294. The return spring 264 urges the valve member 262 to the closed position. Upon energization of the coil 272, the inner tube 260 may be urged against the pole piece 256. The inner tube 260 and the valve member 262 may move away from the seat member 266 against the biasing of the return spring 264. The plug portion of the valve member 262 may be therefore displaced from the valve seat of the seat member 266. In the open position of the valve member 262, the reagent may flow through the seat aperture of the seat member 266 into the nozzle portion 268. The reagent may be atomized by the nozzle portion 268. The atomized reagent may then exit the injector 110 through the bore of the end member 270 and the outlet opening 228 of the first body 202 in the form of a spray. The reagent spray may enter the exhaust stream of the engine 102 and enable selective catalytic reduction (SCR) of the $NO_x$ emissions in the exhaust stream upon passage through the SCR component 114. When injection of the reagent into the exhaust stream is not required, the coil 272 may be de-energized. The return spring 264 may move the inner tube 260 and the valve member 262 to the closed position in the absence of any opposing electromagnetic force.

The injector 110 may be cooled by the fluid received at the fluid inlet 236 of the fluid inlet tube 212, as indicated by the fluid flow path 'F' in FIG. 7. Further, the fluid in the fluid chamber 232 may exit the injector 110 through the fluid outlet tube 214. The fluid in the fluid chamber 232 may cool the conduit portion 226 of the first body 202. The volume of the fluid in the fluid chamber 232 may be optimized to provide efficient cooling. Therefore, one or more components of the valve assembly 216 that are at least partly received within the conduit portion 226 may be cooled. The reagent located in the tube chamber 294 may also be cooled. It is envisioned that this may substantially prevent solidification of the reagent due to high temperatures of the exhaust system 100.

With implementation and use of embodiments herein, at least one of assembling, manufacturing, and operating the injector 110 may be easier compared to assembling, manufacturing, and operating injectors of conventionally known designs. Upon assembly of the injector 110 disclosed herein, the injector core 208 would be constrained with the first body 202. Stated differently, a position of the injector core 208 would be fixed in relation to the first body 202. To assemble the injector 110, the injector core 208, with the connector housing 210, is received, at least partly, within the first body 202 via the main opening 229 and the connector opening 297 of the first body 202. This step of assembly is carried out by moving the injector core 208 in an axial manner, i.e., along the longitudinal axis 'L' of the first body 202 while maintaining a) the lower part 253 of the injector core 208 proximal to the shoulder 296 of the first body 202, and b) the tab 255 of the injector core 208 aligned with the lock opening 249 of the first body 202. By doing so, and also due to relative sizing of the first body 202 and the injector core 208, the interfacing surface 250 of the injector core 208 is positioned at a height 'H' raised above the top surface 280 of the first body 202, as shown best in the view of FIG. 7. Subsequently, the cover member 206 is moved axially, i.e., along the longitudinal axis 'L' to cover, at least partially, the top surface 280 of the first body 202. During this step of assembly, the cut-out 247 of the cover member 206 is kept aligned with the connector opening 297 of the first body 202. When the lip 248 of the cover member 206 is moved past the wide portion 231 of the first body 202, the lip 248 is positioned within, and engaged with, the groove 219 resulting in the top wall 218 of the cover member 206 pressing down, i.e., applying the force '$F_c$' on the interfacing surface 250 such that the force '$F_c$' is transmitted along the load path 'P' extending between the upper and lower parts 251, 253 of the injector core 208.

As the top wall 218 of the cover member 206 presses against, i.e., applies the force '$F_c$' against the interfacing surface 250 of the injector core 208, the top wall 218 prevents axial movement of the injector core 208 relative to the first body 202, i.e., along the longitudinal axis 'L'. As a result of traveling along the load path 'P', the force '$F_c$' of the top wall 218 of the cover member 206 against the interfacing surface 250 of the injector core 208 helps to secure the injector core 208 within the first body 202 as opposed to less than optimal load paths that are typically associated with welding of an injector core to an injector body in previously known designs and configurations of injectors.

Manufacturing the injector 110 can now be done by welding the lip 248 of the cover member 206 to the circumferential wall 217 of the first body 202, i.e., adjoining the groove 219 of the first body 202. Thereafter, the injector core 208 would be fully secured within the first body 202 rendering the injector 110 fit for use in operation. Upon fully securing the injector core 208, operational forces of the valve assembly 216 can be easily withstood by the cover member 206. The pressing force '$F_c$' continues to remain for, at least, a service life of the injector 110 without compromising a releasable securement of the injector core 208 to the first body 202. In addition, the lock opening 249 and the tab 255 co-operatively prevent rotational movement of the injector core 208 about the longitudinal axis 'L'.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. An injector for injecting a reagent, the injector comprising:
   an injector body having an upper portion and a lower portion disposed along a longitudinal axis of the injector body, the upper portion defining a top surface of the injector body;
   an injector core received at least partially within the injector body through the upper portion, the injector core comprising an interfacing surface disposed adjacent to the top surface of the injector body and raised with respect to the top surface; and
   a cover member disposed on the upper portion of the injector body, the cover member comprising:
      a top wall defining an aperture for receiving the injector core therethrough, the top wall disposed proximal to the top surface of the injector body;
      a side wall extending from the top wall; and
      a lip disposed at an end of the side wall, the lip adapted to be attached to a circumferential wall of the injector body through a snap-fit connection, wherein, upon attachment of the lip to the circumferential wall of the injector body, the top wall of the cover member presses on the interfacing surface of the injector core to restrict an axial movement of the injector core relative to the injector body along the longitudinal axis.

2. The injector of claim 1, wherein, upon attachment of the lip to the circumferential wall of the injector body, the top wall of the cover member applies a force on the interfacing surface of the injector core, the force being transmitted along a load path that extends from an upper part of the injector core to a lower part of the injector core.

3. The injector of claim 1, wherein the injector core further comprises an electrical connector housing received at least partially within the upper portion of the injector body, the electrical connector housing defining the interfacing surface.

4. The injector of claim 3, wherein the side wall of the cover member defines a cut-out, the cut-out configured to receive the electrical connector housing therethrough.

5. The injector of claim 4, wherein the upper portion of the injector body defines a connector opening aligned with the cut-out of the cover member, the connector opening configured to receive the electrical connector housing therethrough.

6. The injector of claim 3, wherein the upper portion of the injector body further defines a lock opening, and wherein the electrical connector housing further comprises a tab received in the lock opening to restrict a rotational movement of the injector core relative to the injector body.

7. The injector of claim 1, wherein the lip has a diameter less than a diameter of the side wall.

8. The injector of claim 1, wherein the lip is attached to a groove defined on the circumferential wall of the injector body.

9. The injector of claim 8, wherein the circumferential wall of the injector body further comprises an inclined portion extending from the top surface, wherein the inclined portion is inclined relative to the longitudinal axis of the injector body.

10. The injector of claim 9, wherein the circumferential wall of the injector body further comprises a wide portion disposed between the inclined portion and the groove, wherein a diameter of the wide portion is greater than a diameter of the lip, the inclined portion and the wide portion being configured to bias the lip into the snap-fit connection with the groove.

11. The injector of claim 1, wherein the lip is further attached to the circumferential wall of the injector body by one or more welds.

12. An injector for injecting a reagent, the injector comprising:
   an injector body having an upper portion and a lower portion disposed along a longitudinal axis of the injector body, the upper portion defining a top surface of the injector body;
   an injector core received at least partially within the injector body through the upper portion, the injector core comprising an interfacing surface disposed adjacent to the top surface of the injector body and raised with respect to the top surface; and
   a cover member disposed on the upper portion of the injector body, the cover member comprising:
      a top wall defining an aperture for receiving the injector core therethrough, the top wall disposed proximal to the top surface of the injector body;
      a side wall extending from the top wall; and
      a lip disposed at an end of the side wall, the lip adapted to be attached to a circumferential wall of the injector body through a snap-fit connection, wherein, upon attachment of the lip to the circumferential wall of the injector body, the top wall of the cover member applies a force on the interfacing surface of the injector core to restrict an axial movement of the injector core relative to the injector body along the longitudinal axis, the force being transmitted along a load path that extends from an upper part of the injector core to a lower part of the injector core.

13. The injector of claim 12, wherein the injector core further comprises an electrical connector housing received at least partially within the upper portion of the injector body, the electrical connector housing defining the interfacing surface.

14. The injector of claim 13, wherein the side wall of the cover member defines a cut-out, the cut-out configured to receive the electrical connector housing therethrough.

15. The injector of claim 14, wherein the upper portion of the injector body defines a connector opening aligned with the cut-out of the cover member, the connector opening configured to receive the electrical connector housing therethrough.

16. The injector of claim 13, wherein the upper portion of the injector body further defines a lock opening, and wherein the electrical connector housing further comprises a tab received in the lock opening to restrict a rotational movement of the injector core relative to the injector body.

17. The injector of claim 12, wherein the lip is attached to a groove defined on the circumferential wall of the injector body.

18. The injector of claim 17, wherein the circumferential wall of the injector body further comprises an inclined portion extending from the top surface, wherein the inclined portion is inclined relative to the longitudinal axis of the injector body.

19. The injector of claim 18, wherein circumferential wall of the injector body further comprises a wide portion disposed between the inclined portion and the groove, wherein a diameter of the wide portion is greater than a diameter of the lip, the inclined portion and the wide portion being configured to bias the lip into the snap-fit connection with the groove.

20. An injector for injecting a reagent, the injector comprising:
   an injector body having an upper portion and a lower portion disposed along a longitudinal axis of the injector body, the upper portion defining a top surface of the injector body and a lock opening;
   an injector core received at least partially within the injector body through the upper portion, the injector core comprising an electrical connector housing received at least partially within the upper portion of the injector body, wherein the electrical connector housing defines an interfacing surface disposed adjacent to the top surface of the injector body and raised with respect to the top surface, the electrical connector housing further comprising a tab received in the lock opening of the injector body to restrict a rotational movement of the injector core relative to the injector body; and
   a cover member disposed on the upper portion of the injector body, the cover member comprising:
      a top wall defining an aperture for receiving the injector core therethrough, the top wall disposed proximal to the top surface of the injector body;
      a side wall extending from the top wall; and
      a lip disposed at an end of the side wall, the lip adapted to be attached to a circumferential wall of the injector body through a snap-fit connection, wherein, upon attachment of the lip to the circumferential wall of the injector body, the top wall of the cover member presses on the interfacing surface of the electrical connector housing to restrict an axial movement of the injector core relative to the injector body along the longitudinal axis.

* * * * *